US 10,693,314 B2

(12) United States Patent
Collins et al.

(10) Patent No.: US 10,693,314 B2
(45) Date of Patent: Jun. 23, 2020

(54) ELECTRIC DISTRIBUTION ARCHITECTURE

(71) Applicant: GE Aviation Systems Limited, Cheltenham (GB)

(72) Inventors: John Oliver Collins, Cheltenham (GB); Russell Mark Compton, Droitwich Spa (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 16/095,716

(22) PCT Filed: May 16, 2017

(86) PCT No.: PCT/EP2017/061765
§ 371 (c)(1),
(2) Date: Oct. 23, 2018

(87) PCT Pub. No.: WO2017/198678
PCT Pub. Date: Nov. 23, 2017

(65) Prior Publication Data
US 2019/0267833 A1    Aug. 29, 2019

(30) Foreign Application Priority Data

May 18, 2016    (GB) .................................. 1608701.7

(51) Int. Cl.
*H02J 9/06*    (2006.01)
*B64D 41/00*    (2006.01)
(Continued)

(52) U.S. Cl.
CPC .............. *H02J 9/061* (2013.01); *B64D 41/00* (2013.01); *B64D 47/00* (2013.01); *H02J 1/08* (2013.01);
(Continued)

(58) Field of Classification Search
CPC ...... H02J 9/061; H02J 1/08; H02J 4/00; H02J 5/00; H02J 1/082; B64D 41/00
See application file for complete search history.

(56) References Cited

U.S. PATENT DOCUMENTS

| 5,864,221 A | 1/1999 | Downs et al. |
| 2004/0119454 A1 | 6/2004 | Chang et al. |
| 2008/0100135 A1 | 5/2008 | Lazarovich et al. |

FOREIGN PATENT DOCUMENTS

| DE | 102012107414 A1 | 2/2013 |
| EP | 2432093 A2 | 3/2012 |

(Continued)

OTHER PUBLICATIONS

Great Britain Search Report and Written Opinion dated Nov. 16, 2016 which was issued in connection the Great Britain patent No. GB1608701.7 which was filed on May 18, 2016.
(Continued)

Primary Examiner — Robert L Deberadinis
(74) Attorney, Agent, or Firm — McGarry Bair PC

(57) ABSTRACT

An electric distribution architecture may comprise a main bus delivering current from a main source to a set of distributed loads at a first voltage wherein a subset of the set requires a second voltage lower than the first voltage. A distribution unit may be connected between the main bus and each load of the subset and may include a voltage converter converting the first voltage to the second voltage. A battery bus may deliver current to the subset at the second voltage from a battery when the main bus is not operating. The battery bus may operate at a third voltage higher than the second voltage on the battery bus. The voltage converter may convert the third voltage to the second voltage for the subset when the main bus is not operating, wherein the battery bus has a weight adequate to accommodate a current at the third voltage.

20 Claims, 5 Drawing Sheets

(51) Int. Cl.
  *H02J 4/00* (2006.01)
  *B64D 47/00* (2006.01)
  *H02J 5/00* (2016.01)
  *H02J 1/08* (2006.01)

(52) U.S. Cl.
  CPC ............ *H02J 4/00* (2013.01); *H02J 5/00* (2013.01); *B64D 2221/00* (2013.01); *H02J 1/082* (2020.01)

(56) References Cited

FOREIGN PATENT DOCUMENTS

| | | | |
|---|---|---|---|
| EP | 2727838 | A2 | 5/2014 |
| EP | 2860840 | A1 | 4/2015 |
| EP | 2945244 | A1 | 11/2015 |

OTHER PUBLICATIONS

International Search Report and Written Opinion dated Aug. 11, 2017 which was issued in connection the PCT application No. PCT/EP2017/061765 which was filed on May 16, 2017.

ELECTRIC DISTRIBUTION ARCHITECTURE

BACKGROUND OF THE INVENTION

There is an increasing demand for electrical power in large aircraft as hydraulic and mechanical systems are replaced with electrical components distributed lengthwise along the aircraft. One or more generators located centrally may provide a main power for flight control, passenger comfort, safety, and other systems. In addition, a battery source may provide backup power for emergency loads should the main source fail. Some of these emergency loads are designed to operate directly at a battery voltage, such as at 28V DC, which may be lower than a generator voltage. Unfortunately, the heavier weight of the electrical wires distributing a relatively higher current to the emergency loads may reduce aircraft payload or performance.

One method of preserving aircraft performance and accommodating the increasing electrical demand of today's aircraft is to distribute current from a centralized generator to each emergency load at a relatively high voltage and then down-convert the voltage near each low-voltage load. Advantageously, this reduces the weight of main-power wiring and incorporates a redundant path for the distribution of battery backup power to each load. Unfortunately, heavy wiring is still required to distribute battery backup power from a centralized battery to the emergency loads distributed throughout the aircraft. Additionally, a second voltage converter may be needed at each emergency load, one for main power and one for backup power, adding more weight to the aircraft.

SUMMARY OF THE INVENTION

In one embodiment, there is disclosed an electric distribution architecture which may comprise a main bus delivering current from a main source to a set of distributed loads at a first voltage wherein a subset of the set requires a second voltage lower than the first voltage. A distribution unit may be connected between the main bus and each load of the subset and may include a voltage converter converting the first voltage to the second voltage. A battery bus may deliver current to the subset at the second voltage from a battery when the main bus is not operating. The battery bus may operate at a third voltage higher than the second voltage on the battery bus. The voltage converter may convert the third voltage to the second voltage for the subset when the main bus is not operating, wherein the battery bus has a weight adequate to accommodate a current at the third voltage.

In another aspect, there is disclosed an electric distribution architecture for an aircraft which may comprise a main bus for delivering current from a main source on the aircraft to a set of loads distributed throughout the aircraft at a first voltage. A subset of the set of loads may require a second voltage lower than the first voltage. A distribution unit may be connected between the main bus and each load of the subset. The distribution unit may include a voltage converter for converting the first voltage to the second voltage. The architecture may include a battery bus for delivering current to the set at the second voltage from a battery when the main bus is not operating. The battery bus may operate at a third voltage higher than the second voltage on the battery bus, and the voltage converter may convert the third voltage to the second voltage for the subset when the main bus is not operating, wherein the battery bus has a reduced weight on the aircraft.

In yet another embodiment, there is disclosed a method of distributing electricity on an aircraft, the method comprising delivering current from a main source on the aircraft over a main bus to a set of loads distributed throughout the aircraft at a first voltage. The method may further comprise converting the first voltage to a second voltage lower than the first voltage in distribution units between the main bus and a subset of the set of loads that require the second voltage. The method may further comprise delivering current from a battery to a battery bus connected to the distribution units at a third voltage higher than the second voltage when the main bus is not operating. The method may further comprise converting the third voltage to the second voltage for the subset when the main bus is not operating, wherein the battery bus has a reduced weight on the aircraft.

DETAILED DESCRIPTION

As may be appreciated, based on the disclosure, there exists a need in the art for a distribution architecture that minimizes the weight of electrical wiring between centralized sources of power and electrical loads distributed throughout an aircraft. Additionally, there exists a need in the art for a distribution architecture that establishes a redundant distribution path for emergency loads. Also, there exists a need in the art for a distribution architecture that reduces the number of voltage converters needed to accommodate various generator and load voltages.

Figure 1:
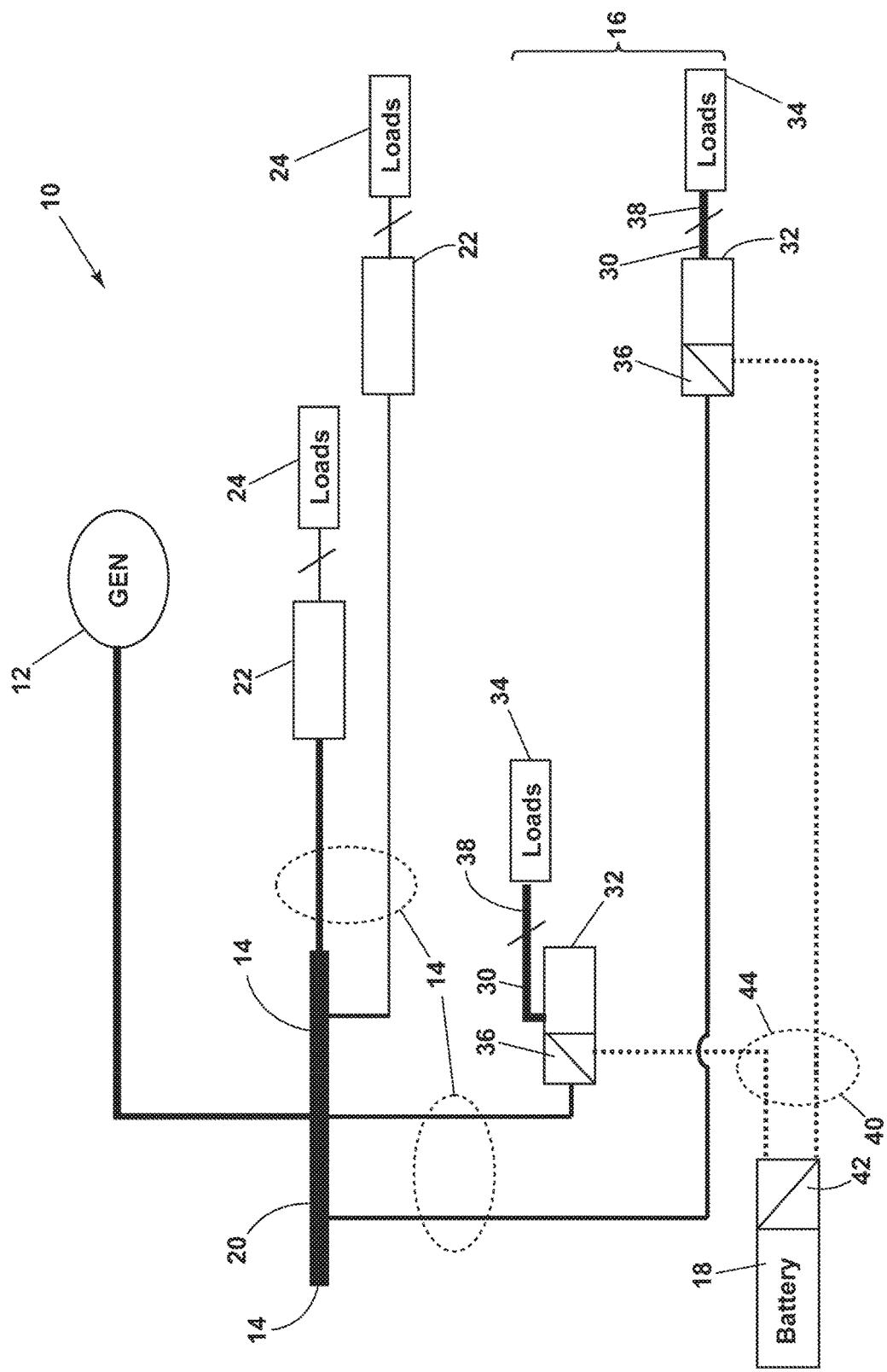
FIG. 1 illustrates a schematic of an electric distribution architecture, in accordance with a first embodiment of the present disclosure.

Referring to FIG. 1, in a first embodiment of the present disclosure, an electric distribution architecture 10 may comprise a main bus 14 for delivering current from a main source 12 to a set of distributed loads 24 and 34 at a first voltage 20 wherein a subset 16 of the set of loads 34 requires a second voltage 30 lower than first voltage 20. The main source 12 may be a generator producing an alternating current (AC) output, and which may produce a 115V AC single-phase or three-phase signal. Alternatively, the main source 12 may be a DC source, or the main source may be a non-generator source such as a ground-based power supply used in maintenance and repair situation. Architecture 10 may further comprise a distribution unit 32 connected between the main bus 14 and each secondary load 34 of the subset 16, where the distribution unit 32 may include a voltage converter 36 for converting the first voltage 20 to the second voltage 30. A transfer unit 22 may be interposed between the main bus 14 and the main loads 24 not part of the subset 16 for feeding multiple main loads 24. Additionally, the functionality of a transfer unit 22 may be incorporated within the distribution unit 32 for feeding multiple secondary loads 34. For example, the transfer unit 22 may be a circuit breaker allowing remote control of each load from a pilot cabin or other central location in an aircraft.

Continuing with FIG. 1, a battery bus 44 may deliver current from a battery 18 at the second voltage to the subset 16 when the main bus 14 is not operating. A boost circuit 42 between battery 18 and battery bus 44 may boost the second voltage 30 to a third voltage 40 higher than the second voltage 30, wherein the voltage converter 36 converts the third voltage 40 to the second voltage 30 for the subset 16 when the main bus 14 is not operating. Battery bus 44 may have a weight 48 (FIG. 2) adequate to accommodate a current at the third voltage 40. The current on the battery bus 44 at the third voltage 40 may be a direct current (DC). The current delivered over load lines 38 at the second voltage 30 may be substantially higher than the current delivered over the battery bus 44 owing to the relatively high third voltage 40, and thus the weight 48 of the battery bus 44 may be substantially reduced relative to a configuration where the battery 18 directly feeds secondary loads 34 at the second voltage 30. For example, a cross-sectional area of wires connecting the boost circuit 42 to the distribution units 32 may be reduced in proportion to the ratio of the third voltage 40 to the second voltage 30, thereby reducing the weight of the battery bus 44 to an amount adequate to prevent excessive heating or fusing of the wires. Alternately, a higher design resistance (not shown) may be allowed between the boost circuit 42 and each load 34 relative to the direct feed configuration while still providing an adequate margin for resistive heating of battery bus 44.

The main bus may not be operating if it has failed, or if it is not selected to be operative. In embodiments not shown, the battery 18 may operate directly at the third voltage 40 without a need for boost circuit 42. For example, battery 18 may operate at and provide a third voltage 40 that is a DC voltage higher than the first voltage, and may operate at 270V DC, beneficially reducing the weight 48 of battery bus 44. Additionally, main bus 14 may operate at and have the first voltage 20 at a high DC voltage (HVDC) such as 270 C DV. Main bus 14 may also operate at a voltage higher than 270 CV DC. Further, battery 18 may comprise any energy storage device such as a fuel cell, backup generator, or hydrogen storage device. Each distribution unit 32 may feed one or more secondary loads 34, and each transfer unit 22 may feed one or more main loads 24.

Figure 2:
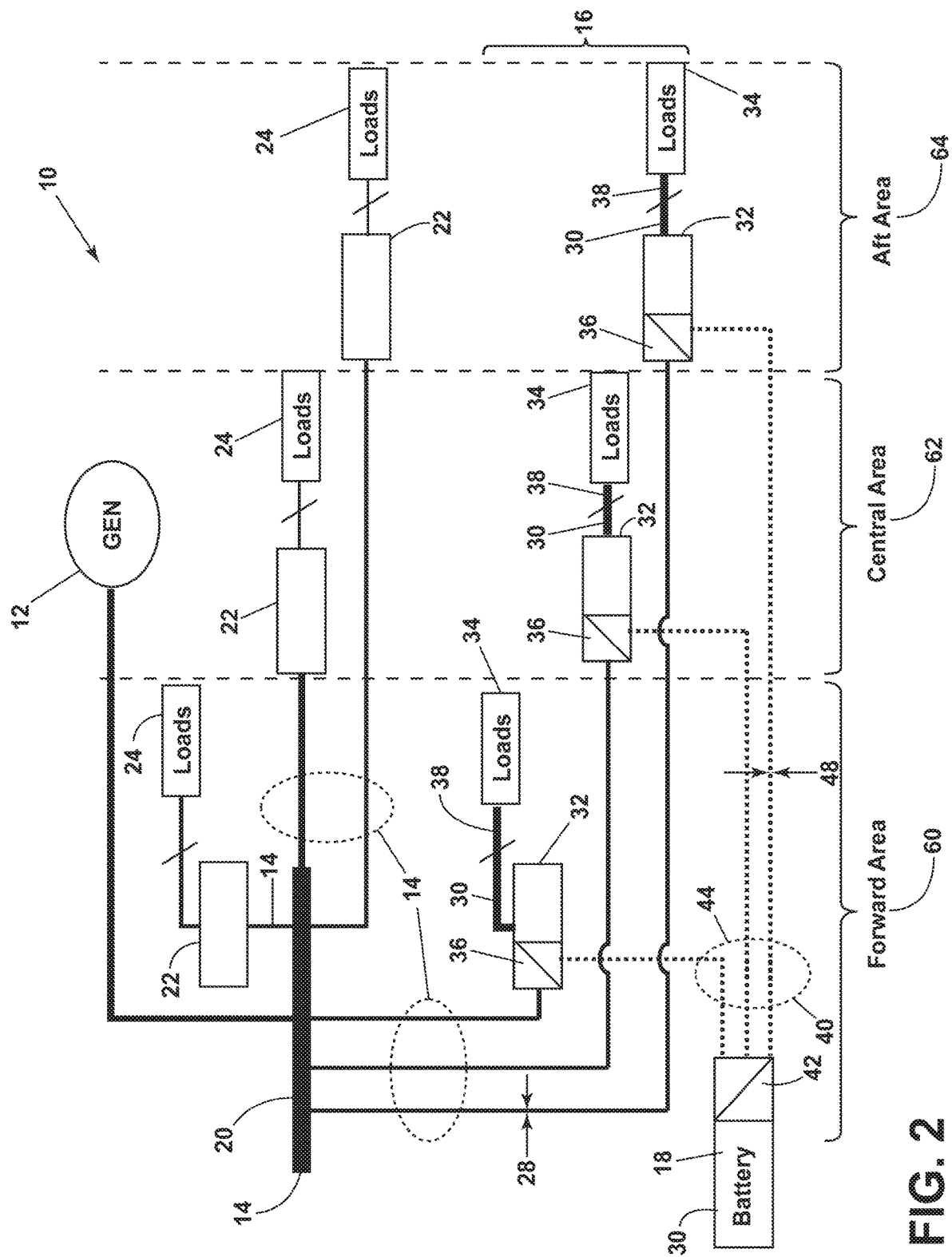
FIG. 2 illustrates a schematic of an electric distribution architecture, in accordance with a second embodiment of the present disclosure.

Referring to FIGS. 1 and 2, architecture 10 may comprise delivering current from a main source 12 to loads 24 and 34 distributed throughout an aircraft, wherein adding a boost circuit 42 between the battery 18 and the battery bus 44 causes the battery bus to have a reduced weight 48 on the aircraft. Alternatively, the battery 18 may directly supply the third voltage 40 to battery bus 44 without boost circuit 42, providing the same reduced weight advantages. For example, a generator 12 located in a central area 62 of the aircraft may distribute the first voltage 20 from a forward area 60 of the aircraft to the secondary loads 34 located in forward 60, central 62, and aft 64 areas of the aircraft, the loads being distributed generally longitudinally and introducing resistive losses (not shown) within the main bus 14. Preferably, operating bus 44 at a third voltage 40 equal to or greater than the first voltage 20 may cause resistive losses in the battery bus 44 to be equal to or less than the resistive losses in the main bus 14, thereby minimizing the weight of the battery bus 44. Transfer unit 22 may be a modular power tile (MPT) including a circuit breaker for each of one or more main loads 24. Distribution unit 32 may include an MPT in addition to the voltage converter 36.

In an embodiment, the second voltage 30 may be 28V DC and may be an operating voltage of various emergency loads such as one or more of evacuation lights, ground proximity warning (GPW), integrated modular avionics (IMA) computer, exterior lighting, fire suppression, navigational electronics, flight control, or instrument display. In an embodiment not shown, architecture 10 may include an adjunct set (not shown) of loads requiring a fourth voltage lower than the first voltage, where the distribution units assigned to the adjunct set include a voltage converter for converting the first voltage and the third voltage to the fourth voltage. In a preferred embodiment, the third voltage may be equal to or higher than the first voltage. For example, the third voltage may be about 270V DC and the first voltage may be about 115V AC. Alternatively, the first voltage 20 may be at 200V AC or higher or may be at 270V DC or higher, where an increasing demand for electrical power may force generator design to migrate to higher voltages.

A topology of the main bus 14 and battery bus 44 may each be a star, a ring, a tree-and-branch, or other topology known in the art. A star, or home run, topology, depicted in FIGS. 1 and 2, may comprise a direct path from the main source 12 to each transfer unit 22 and may comprise a direct path from the boost circuit 42 to each distribution unit 32. A ring topology may comprise a circular bus for the main power overlaying a circular ring for the backup (battery) power, with distribution units 32 deployed around the rings and being fed by each ring. A tree-and-branch architecture may comprise a star topology closer to the source power and a tapped or ring topology to reach individual distribution units. Each may have an advantage in terms of the wire cross section and resultant weight required depending on the current required by each secondary load and the choice for the first and the third voltages.

Figure 3:
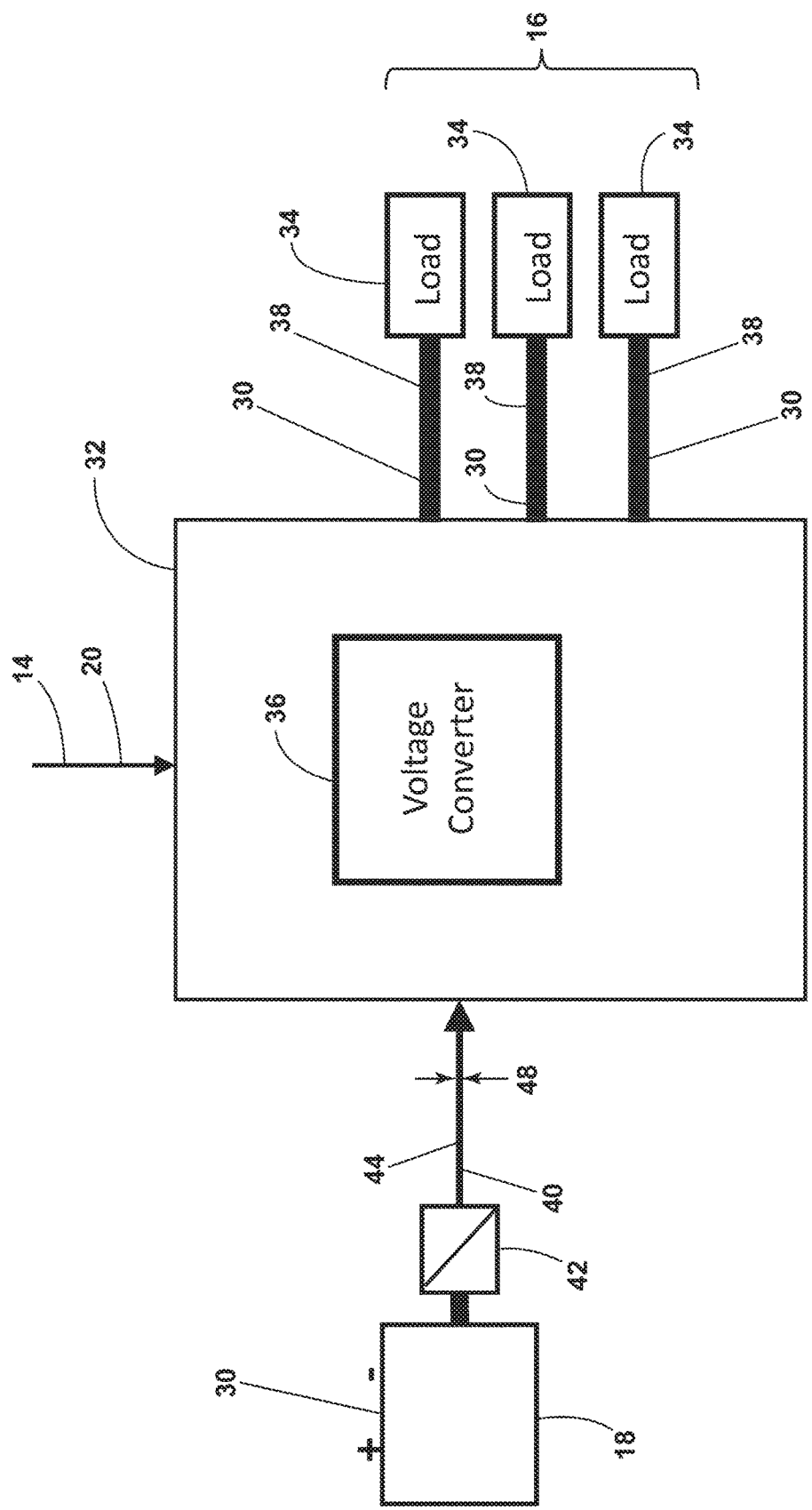
FIG. 3 illustrates a first version of a distribution unit of FIGS. 1 and 2, in accordance with an embodiment of the present disclosure.
Figure 4:
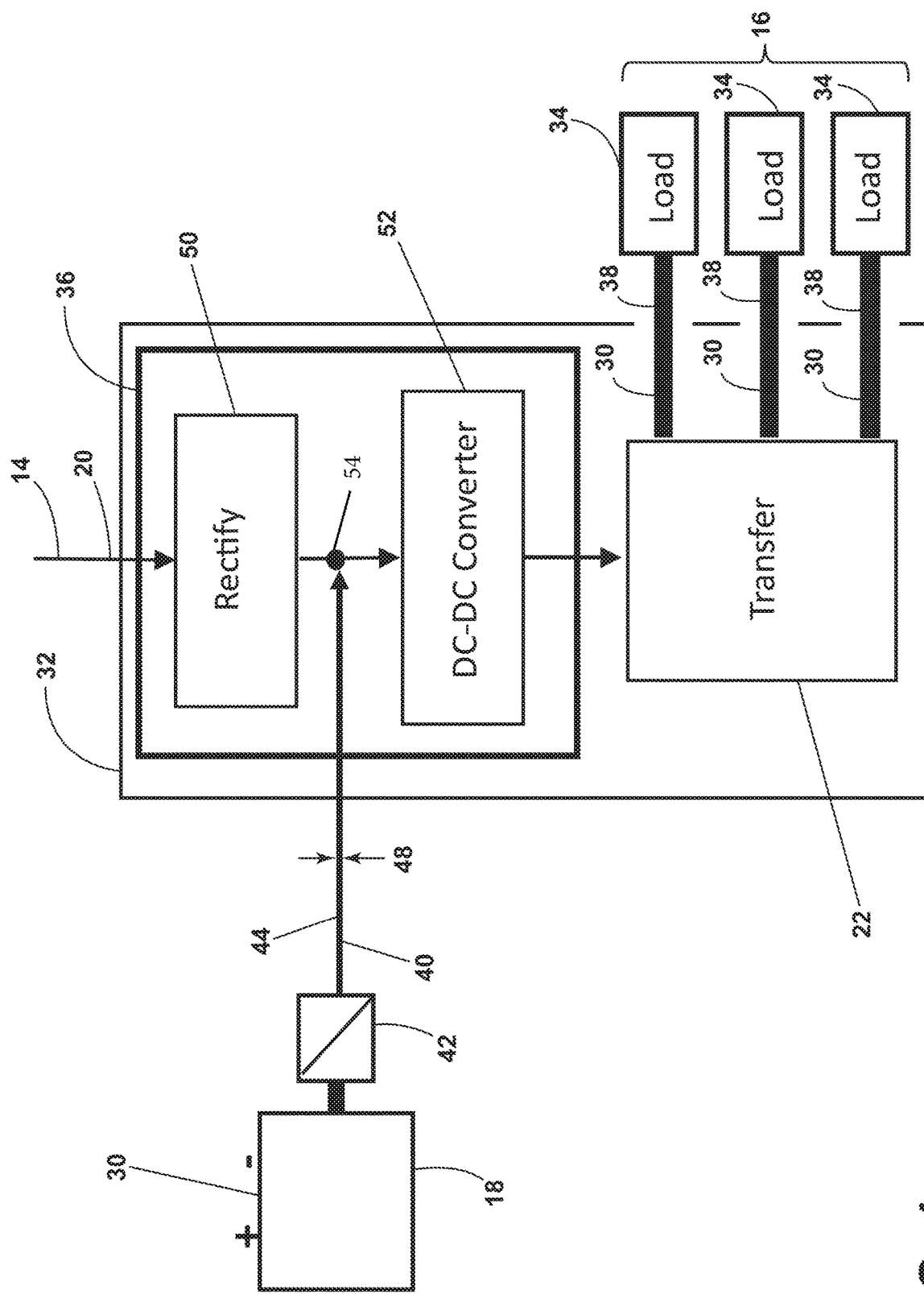
FIG. 4 illustrates a second version of the distribution unit of FIGS. 1 and 2, in accordance with an embodiment of the present disclosure.
Figure 5:
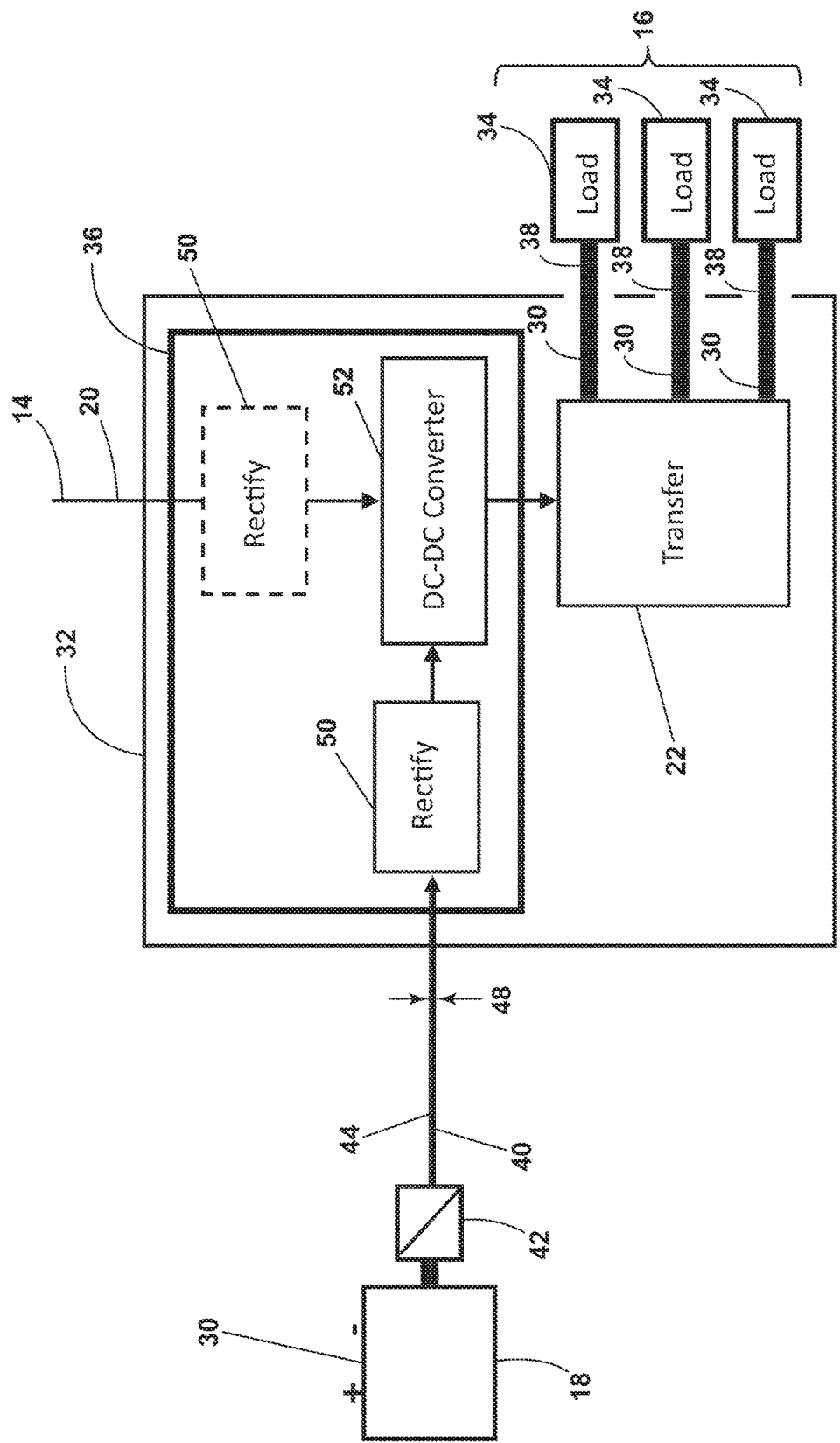
FIG. 5 illustrates a third version of the distribution unit of FIGS. 1 and 2, in accordance with an embodiment of the present disclosure.

Referring now to FIGS. 3-5, various embodiments of the distribution unit 32 are shown which accommodate a variety of main bus 14 and battery bus 44 configurations, such as the architectures of FIGS. 1-2. Distribution unit 32 may include a voltage converter 36 converting the first voltage 20 to the second voltage 30 lower than the first voltage and thereby supply main power to the secondary loads 34 through the load lines 38. Boost circuit 42 between the battery 18 and the battery bus 44 may boost the second voltage 30 to a third voltage 40 higher than the second voltage, wherein the voltage converter 36 converts the third voltage 40 to the second voltage 30 for the subset 16 of secondary loads 34 when the main bus is not operating, and wherein the battery bus 44 has a reduced weight on the aircraft. In FIGS. 3-5, three loads 34 are shown. However, any number of loads 34 may be supplied by any one distribution unit 32. In a preferred embodiment, voltage converter 36 may include a rectifier 50 and a DC-DC converter 52 feeding the loads 34 through the transfer unit 22, where the first voltage is about 115V AC and the third voltage is about 270V DC. In another preferred embodiment, the rectifier (FIG. 4) may rectify the first voltage and the third voltage may equal the rectified first voltage for combining at a DC link input 54 of the DC-DC converter 52. For example, the first voltage may be a three-phase 115V AC source found in aircraft generators, and a rectification to DC link input 54 may beneficially equal the 270V DC input of the third voltage. Advantageously, matching the third voltage and the first voltage to have the same power-equivalent voltage may eliminate the need for a separate DC-DC converter for the third voltage.

In other embodiments, the third voltage 40 may be greater than the first voltage 20. For example, a third voltage of greater than 270V DC and a first voltage of three-phase 115V AC may both utilize DC-DC converter 52. the DC-DC converter 52 accommodating a rectified first voltage during normal operation and accommodating a direct third voltage input when the main bus is not operating. Since the DC-DC converter 52 may accommodate a range of input levels, it may be easy to design such a system with a reduced weight in the distribution unit 32 by having one shared DC-DC converter 52. Alternately, in another embodiment, the third voltage 40 may be less than first voltage 20 such that voltage converter 36 may include a DC boost circuit (not shown) for boosting the third voltage 40 to a DC link 54 voltage sufficient for proper operation of DC-DC converter 52. Rectifier 50 may comprise passive and/or active components know in the art, such as a diode bridge rectifier, to convert an AC signal to a DC signal, and may include any smoothing or filtering circuitry to remove ripple from the rectified waveform.

In another embodiment of FIG. 5, the boost circuit 42 may invert the battery output to an AC waveform and boost it to a third voltage 40 higher than the second voltage 30, where the voltage converter 36 may include an additional rectifier 50 for rectifying the bus voltage 40. In the case of an AC first voltage, both the first and third voltages may each have a rectifier 50 for feeding the DC-DC converter 52. In an embodiment, the first voltage 20 and the third voltage may each be an AC voltage and may be equivalent such that they share (not shown) a common rectifier 50. A relay or switch (not shown) may be disposed at an input to the voltage converter 36 for switching from the main bus 14 to the battery bus 44 in the event of a main bus failure. In another embodiment, the first voltage 20 may be a DC voltage not requiring the rectifier 50 (FIG. 5, dotted line). Beneficially, all combinations where the third voltage exceeds the second voltage may provide a battery bus having a weight adequate to accommodate a current at the third voltage.

Many other possible embodiments and configurations in addition to that shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" or "a plurality of" various elements have been described, it will be understood that "a set" or "a plurality" can include any number of the respective elements, including only one element. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric distribution architecture comprising:
   a main bus for delivering current from a main source to a set of distributed loads at a first voltage wherein a subset of the set of distributed loads requires a second voltage lower than the first voltage;
   a distribution unit connected between the main bus and each load of the subset, the distribution unit including a voltage converter for converting the first voltage to the second voltage;
   a battery bus for delivering current to the subset at the second voltage from a battery when the main bus is not operating; and
   wherein the battery bus operates at a third voltage higher than the second voltage on the battery bus, wherein the voltage converter converts the third voltage to the second voltage for the subset when the main bus is not operating, and wherein the battery bus has a weight adequate to accommodate a current at the third voltage.

2. The electric distribution architecture of claim 1 further comprising a boost circuit interposed between the battery bus and the battery operating at the second voltage.

3. The electric distribution architecture of claim 1 wherein the third voltage is equal to or higher than the first voltage.

4. The electric distribution architecture of claim 1 wherein the current on the main bus is alternating current (AC) and the current on the battery bus is direct current (DC).

5. The electric distribution architecture of claim 4 wherein the voltage converter includes a rectifier and a DC-DC converter.

6. The electric distribution architecture of claim 1 wherein the first voltage is about 115V AC and the second voltage is about 28V DC.

7. The electric distribution architecture of claim 1 wherein the subset includes at least one of evacuation lights, ground proximity warning, IMA avionics computer, exterior lighting, fire suppression, navigational electronics, GPW, flight control, or instrument display.

8. An electric distribution architecture for an aircraft comprising:
   a main bus for delivering current from a main source on the aircraft to a set of loads distributed throughout the aircraft at a first voltage wherein a subset of the set of loads requires a second voltage lower than the first voltage;
   a distribution unit connected between the main bus and each load of the subset, the distribution unit including a voltage converter for converting the first voltage to the second voltage;
   a battery bus for delivering current to the subset at the second voltage from a battery when the main bus is not operating; and
   wherein the battery bus operates at a third voltage higher than the second voltage on the battery bus, wherein the voltage converter converts the third voltage to the second voltage for the subset when the main bus is not operating, and wherein the battery bus has a reduced weight on the aircraft.

9. The electric distribution architecture of claim 1 further comprising a boost circuit interposed between the battery bus and the battery operating at the second voltage.

10. The electric distribution architecture of claim 8 wherein the third voltage is equal to or higher than the first voltage.

11. The electric distribution architecture of claim 8 wherein the current on the main bus is alternating current (AC) and the current on the battery bus is direct current (DC).

12. The electric distribution architecture of claim 11 wherein the converter includes a rectifier and a DC-DC converter.

13. The electric distribution architecture of claim 8 wherein the first voltage is about 115V AC and the second voltage is about 28V DC.

14. The electric distribution architecture of claim 8 wherein the set includes at least one of evacuation lights, ground proximity warning, IMA avionics computer, exterior lighting, fire suppression, navigational electronics, GPW, flight control, or instrument display.

15. A method of distributing electricity on an aircraft, the method comprising:
- delivering current from a main source on the aircraft over a main bus to a set of loads distributed throughout the aircraft at a first voltage;
- converting the first voltage to a second voltage lower than the first voltage in distribution units between the main bus and a subset of the set of loads that require the second voltage;
- delivering current from a battery to a battery bus connected to the distribution units at a third voltage higher than the second voltage when the main bus is not operating;
- converting the third voltage to the second voltage for the subset when the main bus is not operating; and
- wherein the battery bus has a reduced weight on the aircraft.

16. The method of claim 15 wherein the battery operates at the second voltage and further comprising boosting the battery for providing the third voltage on the battery bus.

17. The method of claim 15 wherein the third voltage is equal to or higher than the first voltage.

18. The method of claim 15 wherein the current on the main bus is alternating current (AC) and the current on the battery bus is direct current (DC).

19. The method of claim 18 wherein the converter includes a rectifier and a DC-DC converter.

20. The method of claim 15 wherein the first voltage is about 115V AC and the second voltage is about 28V DC.

* * * * *